(12) United States Patent
Bowman et al.

(10) Patent No.: US 6,402,384 B1
(45) Date of Patent: Jun. 11, 2002

(54) HYDROSTATIC AXLE BEARING

(75) Inventors: Larry W. Bowman, Troy; Patrick D. Laper, Rochester; Raji S. El-Kassouf, Sterling Heights; Michael G. Semke, Novi; Richard M. Clisch, Canton; Gary P. Ford, St. Joseph, all of MI (US); Joseph B. Saxon, Cookeville, TN (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 0 days.

(21) Appl. No.: 09/547,547

(22) Filed: Apr. 12, 2000

(51) Int. Cl.[7] .......................... F16C 32/06; B60B 35/16
(52) U.S. Cl. ...................... 384/100; 301/137; 384/110; 384/113
(58) Field of Search ................... 384/100, 107, 384/108, 109, 110, 111, 113, 114, 115, 118, 119, 120; 301/105.1, 124.1, 137

(56) References Cited

U.S. PATENT DOCUMENTS

| 628,727 A | * | 7/1899 | Schumacher | 384/115 |
|---|---|---|---|---|
| RE20,305 E | * | 3/1937 | Klahn | 384/113 |
| 3,612,205 A | * | 10/1971 | Barrett | 180/308 |
| 4,360,222 A | * | 11/1982 | Fisher | 384/100 X |
| 5,618,115 A | * | 4/1997 | Yates | 384/110 |
| 5,795,073 A | * | 8/1998 | Arvidsson et al. | 384/110 |

FOREIGN PATENT DOCUMENTS

| DE | 3743203 | 7/1989 |
|---|---|---|
| DE | 4228815 | 3/1993 |
| DE | 29910017 | 9/1999 |

* cited by examiner

*Primary Examiner*—Thomas R. Hannon
(74) *Attorney, Agent, or Firm*—Carlson, Gaskey & Olds

(57) ABSTRACT

A drive axle assembly includes a stationary member and a rotating member spaced apart from said stationary member to form a gap. A fluid bearing is formed between the stationary and rotating members by filling the gap with a fluid. The fluid creates a bearing surface between the stationary and rotating members. The fluid is pressurized to provide radial and thrust load support for the rotating member as it rotates with respect to the stationary member.

15 Claims, 2 Drawing Sheets

HYDROSTATIC AXLE BEARING

BACKGROUND OF THE INVENTION

This invention relates to a fluid bearing installed between rotating and stationary axle components that accommodates both radial and thrust loads.

Vehicle drive axle assemblies include various bearing components that provide rotational support for components that rotate within the axle assembly. An example of one application is the use of bearings in a wheel end assembly. A vehicle hub is mounted for rotation about a wheel spindle. The vehicle tire and rim are mounted to the hub. As the hub rotates, the tire rotates which reacts against the ground to move the vehicle in the desired direction. A pair of wheel bearings is mounted between the hub and the spindle to provide rotational support for the wheel hub on the spindle.

Typically, these wheel bearings are tapered roller bearings that accommodate radial loading and thrust loading from one direction. A pair of wheel bearings is required to provide sufficient radial loading support and to accommodate thrust loading from opposing directions. One tapered wheel bearing is mounted in first position to accommodate thrust load from one direction while the other tapered wheel bearing is mounted in a second position to accommodate thrust load from an opposing direction.

One disadvantage with tapered roller bearings is that they are subject to fatigue and wear. If one of the bearings fails further damage to other wheel end components can occur resulting in extensive repairs and downtime. Another disadvantage is that roller bearings are noisy. Additionally, roller bearings are expensive and difficult to install and set to proper pre-load conditions.

Thus, it is desirable to have a simplified bearing that can be used in various bearing applications within a drive axle assembly and that can accommodate radial loading as well as thrust loading from opposing directions. The bearing should also provide quiet operation, be easy to install, and provide minimal efficiency loss.

SUMMARY OF THE INVENTION

In a disclosed embodiment of this invention, a drive axle assembly includes a stationary member and a rotating member spaced apart from the stationary member to form a gap. A fluid is received within the gap to create a bearing surface between the stationary and rotating members. The fluid provides sufficient pressure to rotatably support the rotating member with respect to the stationary member. Thus, a fluid bearing is provided between the stationary and rotating members that can accommodate radial and thrust loading from multiple directions.

In one disclosed embodiment, the stationary member includes a groove and the rotating member includes a protruding rib. The rib is received within the groove. The rib includes a first surface for accommodating radial loads, a second surface for accommodating thrust loads from one direction, and a third surface for accommodating thrust loads from an opposing direction. The fluid filled gap is formed between the rib and the groove and extends along the lengths of the stationary and rotating members.

A preferred method for supporting a rotating member on a stationary member in a vehicle drive axle includes the following steps. The rotating member is spaced apart from the stationary member to form a gap. The gap is filled with a fluid. The fluid is sealed within the gap to form a pressurized fluid bearing between the stationary and rotating members such that the fluid bearing provides load support as the rotating member rotates with respect to the stationary member. Additional steps include forming a groove on one of the stationary or rotating members and a rib on the other of the stationary or rotating members and aligning the rib within the groove.

These and other features of the present invention can be best understood from the following specification and drawings, the following of which is a brief description.

DETAILED DESCRIPTION OF A PREFERRED EMBODIMENT

Figure 1:
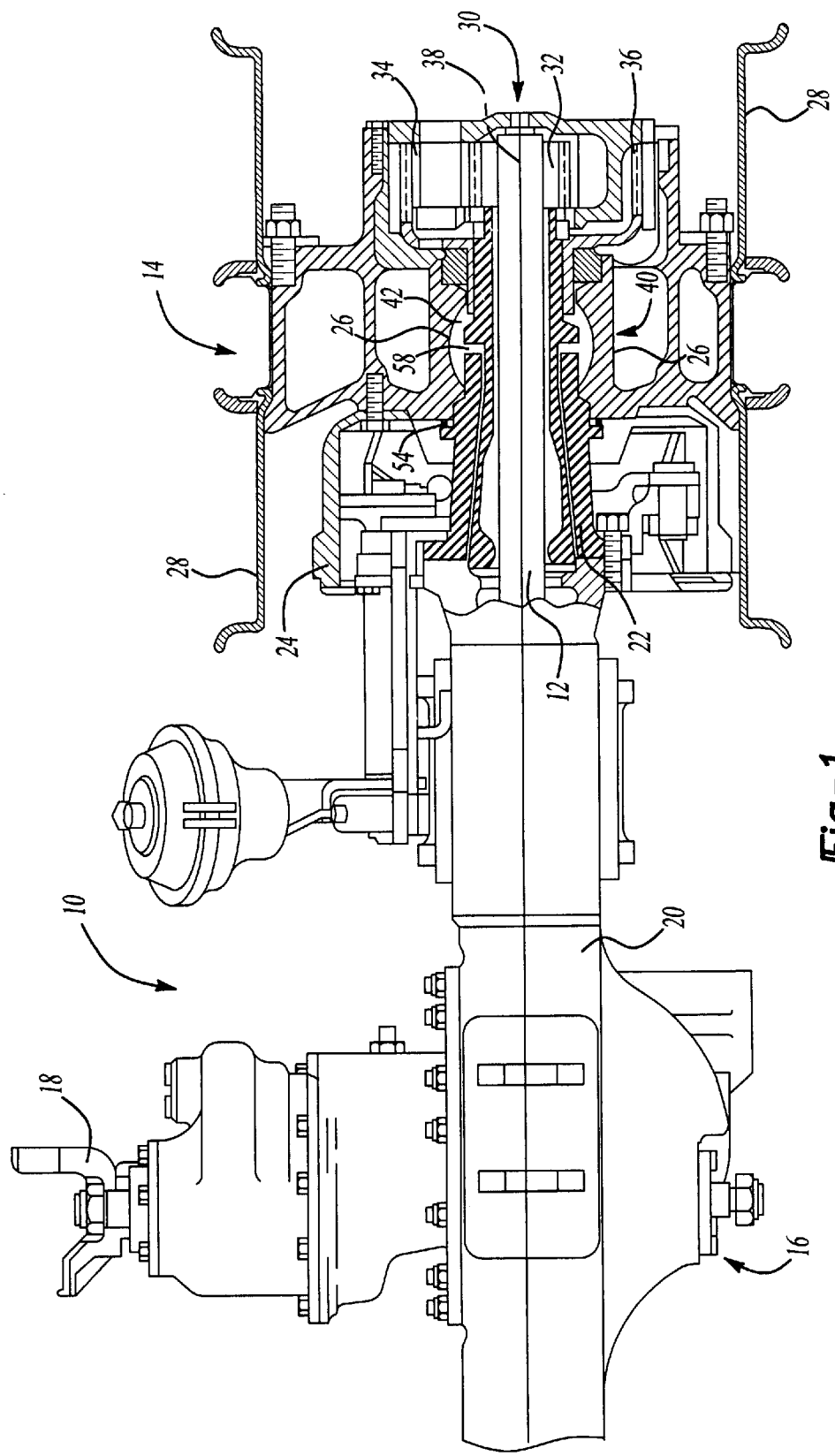
FIG. 1 is cross-sectional view, partially cut away, of a drive axle assembly.

An axle assembly is shown generally at 10 in FIG. 1. The drive axle 10 includes a pair of axle shafts 12 (only one is shown) for driving vehicle wheel end assemblies 14. The drive axle 10 uses a differential assembly, generally shown at 16, to control input speed and torque to the axle shafts 12. The differential assembly 16 receives torque from an input yoke 18, which is coupled to a driveshaft (not shown). The differential assembly 16 and the axle shafts 12 are enclosed within an axle housing 20.

The wheel end assembly 14 includes a spindle 22 that is fixed to the axle housing 20. A brake drum 24 and a wheel hub 26 are mounted for rotation with respect to the spindle 22. The brake drum 24 can be integrally formed with the hub 26 as one piece or can be a separate component. A wet disc brake assembly or a rotating brake disc could be mounted to the axle 10 in place of the drum 24. Tire rims 28 are mounted for rotation with the hub 26. The axle 10 can have dual tires mounted on dual rims 28 as shown in FIG. 1, or a single tire and rim configuration could also be used. A planetary gear assembly, shown generally at 30, is located within the wheel end assembly 14 and is driven by the axle shaft 12.

The planetary gear assembly 30 includes a sun gear 32, a plurality of planet gears 34, and a ring gear 36. The sun gear 32 preferably splined to the axle shaft 12 for rotation with the axle shaft 12. The sun gear 32 drives the planet gears 34, which react between the sun gear 32 and the ring gear 36 to provide reduction at the wheel end 14.

The spindle 22 defines a longitudinal axis of rotation 38. The hub 26 is mounted on the spindle 22 with at least one bearing mechanism 40 for rotation about the axis 38. Thus, the spindle 22 remains stationary and fixed to the housing 20 while the hub 26 and rims 28 rotate about the spindle 22.

Figure 2:
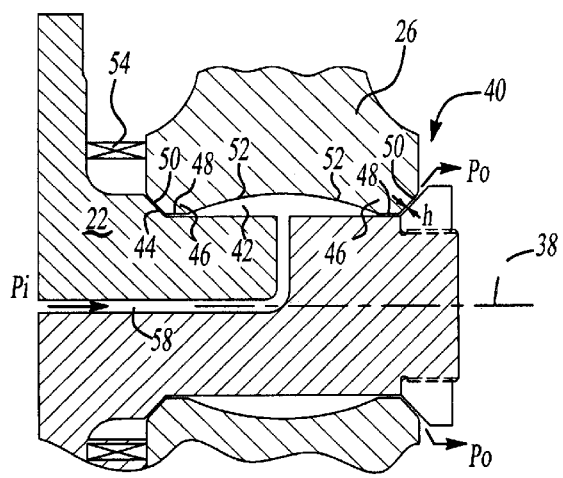
FIG. 2 is a partial cross-sectional view of a wheel end assembly incorporating one embodiment of the subject invention.

As shown in FIG. 2, the hub 26 is spaced apart from the spindle 22 to form a gap 42 between the components. The bearing mechanism 40 is partially installed within this gap 42. The bearing mechanism 40 is comprised of a fluid that is received within the gap 42 creating a bearing surface between the spindle 22 and hub 26. The fluid should provide sufficient pressure between the components to rotatably support the hub 26 with respect to the spindle 22. Many hydraulic fluids known in the art can be used, however the fluid should be able to withstand high rotational speeds and increased temperatures without breaking down.

In the preferred embodiment, a groove 44 extends about the circumference of the spindle 22 and at least one rib portion 46 extends about the circumference of the hub 26. Preferably a pair of ribs 46, one at each end of the hub 26, are aligned and received within the groove 44. The ribs 46 are formed with a top surface 48 and a first side surface 50 and a second side surface 52. The fluid reacts against the side surfaces 50, 52 such that fluid pressure formed within the gap 42 between the ribs 46 and groove 44 simultaneously provides radial load support and thrust load support for the hub 26. At least one seal assembly 54 is used to provide a sealed and pressurized system. Any type of seal assembly known in the art can be used but preferably a seal assembly that can accommodate rotational forces is used.

Figure 3:
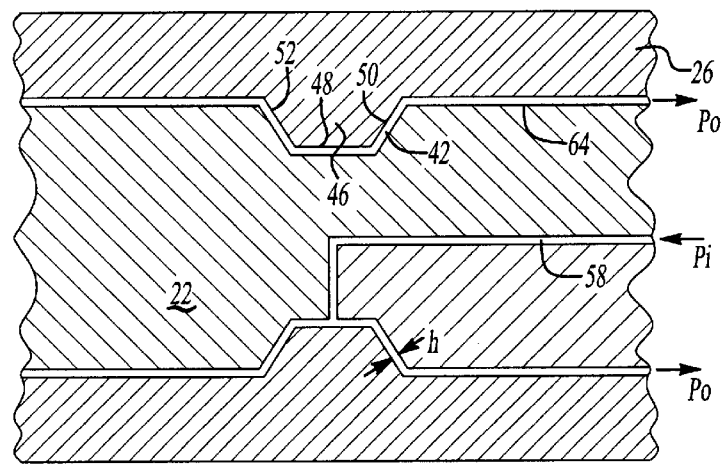
FIG. 3 is a partial cross-sectional view of a wheel end assembly incorporating one embodiment of the subject invention.

The top surface 48 is preferably a flat surface (as viewed in the sections shown in FIGS. 2 and 3) with the first side surface being generally planar and positioned at a non-perpendicular angle with respect to the adjacent surface 50. The second surface 52 can also be planar and positioned at a non-perpendicular angle with respect to the top surface 48, as shown in FIG. 3, or can be curved as shown in FIG. 2.

Figure 4:
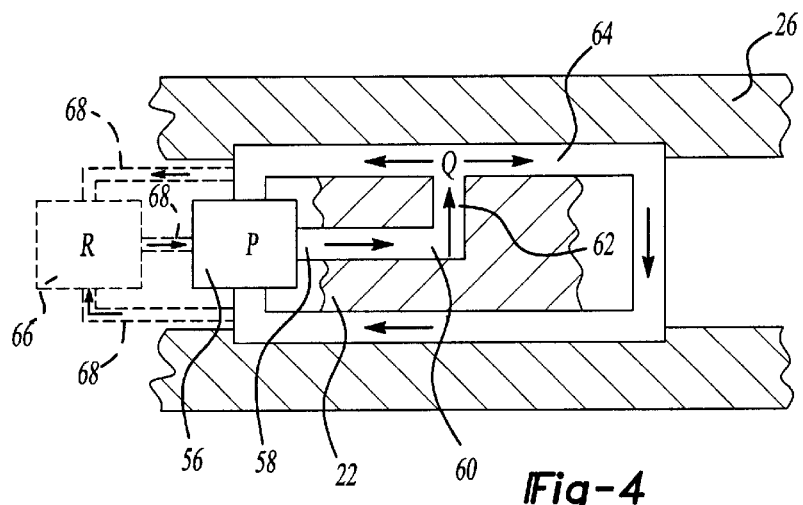
FIG. 4 is a schematic view of a flow system for the subject invention.

In one embodiment, shown schematically in FIG. 4, a fluid pump 56 is used to provide a constant pressure flow Q between the hub 26 and the spindle 22. A separate pump 56 can be installed within the axle 10, or another pump already incorporated into the vehicle such as a power steering pump, for example, could be used. Preferably, the spindle 22 includes an input channel 58 formed within an interior portion of the spindle 22. The input channel 58 includes a first portion 60 that is parallel to the axis 38, shown in FIG. 2, and a second portion 62 that extends out radially from the first portion 60. The fluid is pumped through the input channel and into the gap 42 which forms an output channel 64. The fluid returns to the pump 56 via the output channel 64.

A fluid film thickness h is formed between the hub 26 and the spindle 22 is equal in height to the gap 42 when the system is pressurized. Due to the fluid flow Q and the film thickness h, there is a pressure differential created between the pressure in Pi and the pressure out Po (i.e., $\Delta P=Pi-Po$). This pressure differential provides radial and thrust load support for the hub 26. The fluid flow Q can be returned directly to the pump 56 or could be returned through a cooling heat exchanger or radiator 66 (see dashed lines in FIG. 4) before being returned to the pump 56.

The radiator 66 is preferred when high rotational speeds or abusive duty cycles cause the fluid to overheat. Standard fluid connections 68 are used between the fluid output channel 64 and the radiator 66 and between the radiator 66 and the pump 56. The fluid flow path initiates from the pump 56 and flows into the fluid input channel 58 to the fluid output channel 64. The fluid then flows into the radiator 66 and returns to the pump 56.

The method for supporting a rotating hub 26 on a stationary spindle 22 includes the following steps. The hub 26 is spaced apart from the spindle 22 to form a gap 42. The gap 42 is filled with a fluid and the fluid is sealed within the gap to form a pressurized fluid bearing 40 between the hub 26 and spindle 22. The fluid bearing 40 provides load support as the hub 26 rotates with respect to the spindle 22. Additional steps include forming a groove 44 on one of the hub 26 or spindle 22 members and at least one rib 46 on the other of the hub 26 or spindle 22 members. The rib(s) 46 are then aligned within the groove 44. Further steps include providing a first surface on the rib 46 to accommodate radial loading, providing a second surface on the rib 46 to accommodate thrust loading from one direction, and providing a third surface on the rib 46 to accommodate thrust loading from an opposing direction.

The unique fluid bearing 40 provides a simplified bearing mechanism that can be used in various bearing applications within a drive axle assembly 10. The subject bearing 40 can accommodate radial loading as well as thrust loading from opposing directions and also provides quiet operation and easy to installation.

Although a preferred embodiment of this invention has been disclosed, it should be understood that a worker of ordinary skill in the art would recognize many modifications come within the scope of this invention. For that reason, the following claims should be studied to determine the true scope and content of this invention.

What is claimed is:

1. A drive axle assembly comprising:
   a stationary member including a groove extending about the circumference of said stationary member;
   a rotating member spaced apart from said stationary member to form a gap, said rotating member including at least one rib extending about the circumference of said rotating member, said rib being received within said groove; and
   a fluid received within said gap creating a bearing surface between said stationary and rotating members wherein said fluid provides sufficient pressure to rotatably support said rotating member with respect to said stationary member.

2. An assembly according to claim 1 wherein said rib is formed with a top surface and side surface such that fluid pressure formed within said gap between said rib and groove simultaneously provides radial load support and thrust load support for said rotating member.

3. An assembly according to claim 2 wherein said top surface is generally planar with said side surface being generally flat and positioned at a non-perpendicular angle with respect to said top surface.

4. An assembly according to claim 1 including at least one seal assembly for sealing said fluid within said gap.

5. An assembly according to claim 4 including a fluid pump for creating pressure flow between said stationary and rotating members wherein said gap forms a fluid output channel for return flow to said pump.

6. An assembly according to claim 5 wherein said stationary member includes an internal passageway forming a fluid input channel that is in communication with said fluid output channel.

7. An assembly according to claim 6 including a radiator for receiving heated fluid via said fluid output channel and transmitting cooled fluid to said fluid pump.

8. An assembly according to claim 7 including fluid connections between said fluid output channel and said radiator and between said radiator and said pump to form a flow path flowing from said pump to said fluid input channel, to said fluid output channel, to said radiator, and returning to said pump.

9. An assembly according to claim 1 wherein said stationary member is formed as an axle spindle and said rotating member is formed as a hub mounted for rotation about said spindle.

10. An assembly according to claim 1 wherein said at least one rib comprises a pair of ribs laterally spaced apart from one another along said rotating member.

11. A wheel end assembly for a vehicle drive axle comprising:
- a spindle defining an axis of rotation and including at least one groove formed about the circumference of said spindle;
- a wheel hub mounted for rotation with respect to said spindle about said axis and including at least one rib formed about the circumference of said wheel hub, said rib being received within said groove; and
- a fluid bearing for providing rotational load bearing support for said wheel hub on said spindle, said fluid bearing including a fluid having a minimum film thickness formed between said spindle and said wheel hub.

12. An assembly according to claim 11 wherein said spindle is spaced apart from said wheel hub to form a circumferential gap extending longitudinally along the length of said spindle, said fluid being received within said gap.

13. An assembly according to claim 12 including at least one seal assembly for providing a pressurized and sealed system between said spindle and said wheel hub.

14. An assembly according to claim 13 wherein said rib includes a top surface for accommodating radial loads and side surfaces for accommodating thrust loads from opposing directions.

15. An assembly according to claim 11 wherein said at least, one rib comprises a pair of ribs laterally spaced apart from one another along said wheel hub.

* * * * *